United States Patent

[11] 3,634,736

[72] Inventors Donald L. Boos;
Joseph E. Metcalfe, both of Cuyahoga, Ohio
[21] Appl. No. 71,852
[22] Filed Sept. 14, 1970
[45] Patented Jan. 11, 1972
[73] Assignee The Standard Oil Company
Cleveland, Ohio

[54] ELECTROLYTIC CAPACITOR EMPLOYING PASTE ELECTRODES
10 Claims, 3 Drawing Figs.

[52] U.S. Cl..................................................... 317/230,
29/570
[51] Int. Cl..................................................... H01g 9/00
[50] Field of Search............................................. 317/230,
231, 233, 237

[56] References Cited
UNITED STATES PATENTS
2,005,279 6/1935 Van Geel et al. .............. 317/230

| | | | |
|---|---|---|---|
| 2,299,667 | 10/1942 | Waterman..................... | 347/230 |
| 2,800,616 | 7/1957 | Becker......................... | 317/230 |
| 3,288,641 | 11/1966 | Rightmire..................... | 317/231 X |
| 3,536,963 | 10/1970 | Boos............................ | 317/230 |

Primary Examiner—James D. Kallam
Attorneys—John F. Jones and Sherman J. Kemmer

ABSTRACT: A high-capacitance, low-voltage electrolytic capacitor consists essentially of a pair of paste electrodes and a separator saturated with electrolyte which functions as an electronic insulator and an ionic conductor. One of said electrodes is composed of active carbon and the opposing electrode is composed of refractory hard boron carbide or a refractory hard metal carbide or boride wherein the metal may be tungsten, titanium, tantalum, niobium or zirconium, said electrodes being prepared by mixing finely divided particulate material of the above compositions with electrolyte to form a viscous paste and compressing the paste to form the electrodes.

PATENTED JAN 11 1972 3,634,736

INVENTORS
DONALD L. BOOS
JOSEPH E. METCALFE
BY John G. Jones

ATTORNEY

ELECTROLYTIC CAPACITOR EMPLOYING PASTE ELECTRODES

The present invention relates to a miniaturized high-capacitance, low-voltage electrolytic capacitor. More particularly this invention relates to a capacitor comprising a pair of paste electrodes, a separator which functions as an electronic insulator and an ionic conductor, and an electrolyte disposed on and within the pores of the separator.

The novel feature of the capacitor described herein resides in the paste electrode structure. The paste electrodes comprise a carbon electrode and an opposing electrode consisting of refractory hard boron carbide or a refractory hard metal carbide or boride wherein the metal may be tungsten, titanium, tantalum, niobium, or zirconium. In accordance with this invention the electrodes are manufactured by mixing finely divided particulate material of carbon or of the refractory boron carbide or refractory metal carbide or boride with an electrolyte to form a paste, and subsequently compressing the paste to from the electrodes. The electrodes of this device have good electrical conductivity and are resistant to corrosion.

The paste electrode capacitor of this invention may be useful as a replacement for conventional electrolytic capacitors and applications where an extremely high capacitance and very low series resistance is required. The series resistance in this type of capacitor consists of the sum of the electronic resistance in the electrodes and the ionic resistance of the electrolyte. The capacitor described herein may be useful as DC power sources in flasher signals, lighted buoys, cordless applicances and related products. Further, the capacitor of this invention is particularly suited for computer power supplies because the logic circuits in digital computers require high-amperage and low-voltage direct current.

The paste electrode capacitor herein described possesses several important advantages over the capacitors disclosed in the prior art. Since the electron conductor is divided and separated by a non-electron-conducting separator, electrical charges are stored at the boundaries between the electron conducting and non-electron-conducting portion of the circuit. The device develops its capacity by building up a charge at the electrode/electrolyte interface, and the greater this interface area the greater the capacity. In the instant invention the electrode/electrolyte interface area is maximized without increasing the overall physical size of the capacitor by providing a highly porous carbon electrode which forms extensive boundary surfaces on exposure to the electrolyte. Accordingly, in a preferred embodiment of this invention, the highly porous carbon electrode is in the form of a thin plate formed from activated carbon having a surface area in the range of from about 100 meters$^2$/cc. to 2,000 meters$^2$/cc. and preferably in the range of 500–1,500 meters$^2$/cc. as determined by the conventional Brunauer, Emmett and Teller method. Although it is also desirable for the opposing refractory metal electrode to have a high surface area, surface area is not as critical here since some reaction does occur at the refractory metal electrode.

In addition to high capacitance as a result of the use of a highly porous electron conductor, other advantages associated with the capacitor of the present invention are that the paste electrodes are sufficiently flexible to resist cracking and breaking and thereby can be manufactured in minimum dimensions. Whereas the minimum thickness of the prior art electrodes is limited by the fragile nature of the material, the thickness of the paste electrode is not so limited.

The paste electrode can be deposited on a support surface as a very thin film by known techniques, such as silk screening, spraying, or roll coating. Since electronic resistance is directly proportional to the thickness of an electrode, reducing the thickness produces a corresponding reduction in electronic resistance as well as reduction of the reequilibration charge on interruption of the discharge current.

The invention will be more readily understood from the following detailed description taken in conjunction with the drawing wherein:

FIG. 1 represents a single-cell electrolytic capacitor consisting of a pair of electrode assemblies 10, 11. Each electrode subassembly consists of an electronic conducting and ionic insulating member 12 which can be made of, for example, carbon, lead, iron, nickel, or any of the conducting alloys. Member 12 is characterized by its electrical conducting property and its chemical inertness to the particular electrolyte employed at the potential impressed upon it. Its primary functions are as a current collector and an intercell ionic insulator. If the particular electronic conducting and ionic insulating member is susceptible to corrosion by the electrolyte or is not completely impervious thus permitting the electrolyte to seep through and corrode adjoining components, the surfaces of the member can be provided with a coating of a noble metal or a substance such as colloidal graphite in a solvent such as alcohol, to minimize such problems. This procedure is also effective in reducing leakage currents by better than a factor of 10.

An annular means or a gasket 15 is preferably cemented or in some manner affixed to conducting member 12. Since the carbon electrode 13 and the opposing electrode 14 are not rigid masses but are to some extent flexible, the principal function of gasket 15 is to confine electrodes 13 and 14 and prevent the mass of the electrode material from seeping out. The gasket is preferably constructed from an insulating material although it need not necessarily be limited to this type of material. The gasket material should be flexible to accommodate expansion and contraction of the electrode. Other obvious ways of confining the electrode should be apparent to those skilled in the art.

Separator 16 is generally made of a highly porous material which functions as an electronic insulator between the electrodes yet allows free and unobstructed movement to the ions in the electrolyte. The pores of the separator 16 must be small enough to prevent contact between the opposing electrodes, since such a condition would result in a short circuit and consequent rapid depletion of the charges accumulated on the electrodes. The separator can also be a nonporous ion-conducting film, such as an ion exchange membrane. Any conventional battery separator should be suitable, and materials such as porous polyvinyl chloride, glass fiber filter paper (Watman G.F.A.), cellulose acetate, mixed esters of cellulose and fiberglass cloth have been found to be useful. Prior to its use, it is advantageous to saturate the separator with electrolyte. This can be accomplished by soaking the separator in the electrolyte for a period of time of up to about 15 minutes. A surfactant, such as a photographic wetting agent (Kodak's Photo-Flo solution), may be added to the electrolyte for the purpose of facilitating wetting of the separator and the electrode. Photo-Flo solution seems to be effective only with neutral electrolytes. However other surfactants can be used in acidic or basic electrolytes.

The carbon electrode 13 consists of activated carbon particles in admixture with the electrolyte. Activation of carbon is the process by which adsorption properties and surface area are imparted to a naturally occurring carbonaceous material. Because electrical energy storage of a capacitor is apparently based on surface area, an increase in energy storage can be expected from an increase in surface area, as by activation.

The surface area of the carbon is mainly internal and may be generated by numerous activation methods. In general, active carbon contains 80 percent or more of carbon, as well as hydrogen, nitrogen, oxygen, sulfur and inorganic salts that leave an ash on combustion. The pores in the activated carbon material must be sufficiently large to permit electrolyte penetration.

Active carbon may be prepared by initially carbonizing or charring the carbon in the absence of air below about 600° C. Any carbon-containing substance can be charred. The charred carbon is then activated usually by controlled oxidation with a suitable oxidizing gas at elevated temperatures. Most of the present commercial processes involve steam or carbon dioxide activation between 800° and 1,000° C., or air oxidation between 300° and 600° C., for a period of 30 minutes to 24 hours, depending on the oxidizing conditions and the quality of active carbon desired. Other activation methods include activation with metallic chlorides and electrochemical activation. The latter is a process whereby capacity of an electrode can be increased by electrochemical cycling.

Activated carbon made from hard and dense material, is usually carbonized, crushed to size, and activated directly to give hard and dense granules of carbon. In other cases, it is advantageous to grind the charcoal, coal, or coke to a powder, form it into briquettes or pellets with a tar or pitch binder, crush to size, calcine to 500°–700° C., and then activate with steam or flue gas at 850°–950° C. The latter procedure results in particles having a tailored structure which are more easily activated because they possess more entry channels or macropores for the oxidizing gases to enter and for the reaction products to leave the center of the particles.

The opposing electrode 14 consists of finely divided particulate material of refractory boron carbide or a refractory hard metal carbide or boride of tungsten, titanium, tantalum, niobium or zirconium, in admixture with an electrolyte. The refractory compositions in admixture with the electrolyte preferredly have a particle size of less than 10 microns.

In preparing the paste electrodes for use in the capacitor described herein, activated carbon or the refractory carbide or boride in the form of a powder is mixed with an electrolyte to form a thick slurry. The powdered carbon or refractory composition should be employed in a ratio of about 1 to 3 parts of powdered material to about 3 to 1 parts of the electrolyte by weight. The use of coarse particles should be avoided so that the jagged features of the coarse particles do not penetrate the separator and establish contact between the opposing electrodes, thus causing a short. Water or other diluents may be used to facilitate preparation of the slurry. The excess water or diluent is extracted from the slurry by conventional means, leaving a viscous paste which may be compressed into an electrode pellet by applying a predetermined amount of pressure. Upon application of pressure, some liquid will generally exude from the paste.

The electrolyte should consist of a highly conductive liquid medium that is compatible with and is noncorrosive to the electrodes. The electrolyte may comprise an aqueous solution of an acid, salt, or a base such as for example, ammonium chloride, sodium chloride, calcium chloride, potassium chloride, potassium carbonate, sulfuric acid, fluoroboric acid, sodium hydroxide, potassium hydroxide, etc. In applications wherein conductivity of an electrolyte determines its selectivity, 30 percent sulfuric acid and 32 percent fluoroboric acid are especially desirable.

Nonaqueous electrolytes may also be used. Solutions of metal salts of organic and inorganic acids, ammonium and quaternary ammonium salts, etc. may be employed in organic solvents such as organic nitriles as for example acetonitrile, propionitrile; sulfoxides such as dimethyl-, diethyl-, ethyl methyl-, and benzylmethyl sulfoxide; amides such as dimethyl formamide; pyrrolidones such as N-methylapyrrolidone; and carbonates such as propylene carbonate. Other suitable nonaqueous electrolytes are disclosed in the Proceedings of 19th and 20th Annual Power Sources Conference publications.

The electrolyte in the electrode structure has three functions: (1) as a promoter of ion conductivity, (2) as a source of ions, and (3) as a binder for the solid particles of the electrodes. Sufficient electrolyte should be employed to accommodate these functions. A separate binder can be employed to perform binding function of the electrolyte, however, the binder would undesirably add an element of resistance.

The pressure applied in forming the electrodes is dependent on many variables such as dimensions of the electrode, particle size of the powdered material, particular electrolyte used, etc. The amount of pressure used should be within a range that will leave an amount of electrolyte within the electrode structure sufficient to accomplish the three functions referred to earlier.

In the assembly of the capacitor a pair of electrodes thus produced by the method heretofore described are placed within a separate annular gasket member 15 which is affixed to an impervious separator plate 12. A separator membrane 16 saturated with the electrolyte is interposed between the two electrodes 13 and 14 and this capacitor cell is disposed on a lower platen of a press. The upper platen is brought down upon the cell until the surfaces make contact and a concentric ring is slipped over the cell. At this point, the capacitor cell is confined by the upper platen, the lower platen, and the concentric ring. The cell is then compressed at a pressure sufficient to render the cell a coherent structure. Pressure of the order of about 240 p.s.i. has been found sufficient. Other methods known to those skilled in the art may be utilized to produce a coherent structure.

Figure 1:
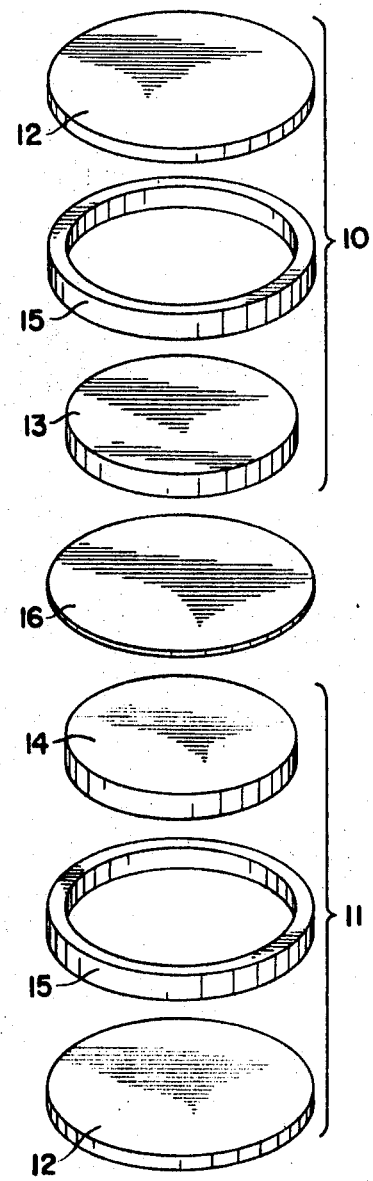
Figure 2:
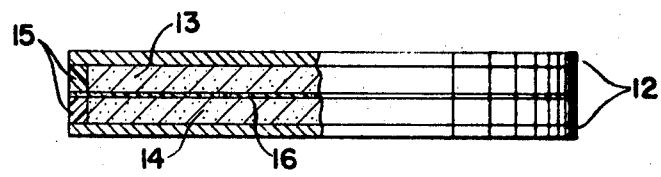
FIG. 2 shows an assembled capacitor cell. Identical reference numerals to those used in FIG. 1 denote corresponding components of the cell.
Figure 3:
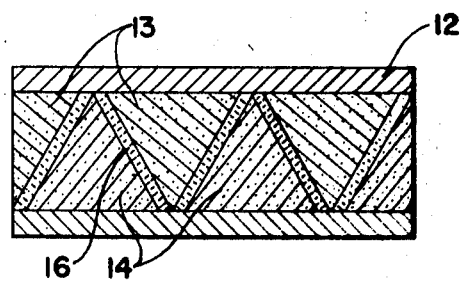
FIG. 3 illustrates another embodiment of the capacitor which utilizes elongated paste electrodes which are triangular in cross section. The same reference numerals, as in FIG. 1, are used to denote corresponding parts.

A multicell capacitor may be constructed from stacked unit cells or with a series of double electrodes capped with single electrodes on each end.

EXAMPLE I

A carbon paste electrode was prepared by mixing a sufficient amount of an aqueous solution of 30 percent $H_2SO_4$ with activated carbon particles to form a slurry. The carbon* (*Carbon material meeting above specifications was obtained from West Virginia Pulp and Paper Company under the designation of Nuchar C–115.) particles had the following specifications:

| | |
|---|---|
| Color | black |
| Odor | none |
| Taste | none |
| Fineness: | |
| through 100 mesh | 91–99 |
| through 200 mesh | 70–90 |
| through 325 mesh | 50–75 |
| Density, lb., cu./ft. | 15–17 |
| Surface Area, B.E.T. (m.$^2$/g.) | 700–950 |
| Pore Volume (cc./g.) | 0.8 |
| Iodine Value | 90–96 |
| Water Solubles | 3% maximum |
| Total Ash | 6% maximum |
| Moisture | 3% maximum when packed |
| Typical Pore Area Distribution: | |
| 20 A. | 512 |
| 20–30 A. | 115 |
| 30–40 A. | 77 |
| 40–50 A. | 36 |
| 50–60 A. | 9.0 |
| 60–80 A. | 7.5 |
| 80–100 A. | 1.9 |
| 100–120 A. | 5.4 |

A paste was obtained by drying the slurry to remove water and removing the excess electrolyte by filtration. 0.14 gram of the paste was placed in a die and compressed under a ram force pressure of 5,000–1,200 p.s.i.

The opposing electrode was prepared by mixing tungsten boride powder, ($W_2B_5$), obtained from Shield alloy Corporation and having a particle size equivalent to −325 mesh (2.8 microns), with a sufficient amount of 30 percent aqueous sulfuric acid to form a slurry, and then vacuum filtering the slurry to remove the excess electrolyte. The remaining tungsten boride, electrolyte mixture had the consistency of a paste and was applied directly into the cavity formed by the gasket and the impervious separator.

The gasket was stamped from a sheet of a fluoroelastomer prepared form a copolymer of vinylidene fluoride and hexafluoropropylene, sp. gr. 1.72–1.86, and cemented by means of an adhesive (Duro Contact) to a circular disk of a flexible vinyl film having incorporated therein special carbon black to obtain maximum electrical conductivity and having the properties: break strength (Mach. Dir.) 20 pounds, (Cross Mach. Dir.) 20 pounds, elongation 85 percent, specific resistance 1.5 ohms (Condulon CV5R100 obtained from the Plastic Film Co. Plainfield, Conn.). The gasket had a thickness of 0.015 inch, an I.D. of 0.75 inch, and O.D. of 1.125 inch. The circular vinyl film material functioned as an electronic conductor and an ionic insulator and had a thickness of 0.003 inch and a diameter of 1.125 inch.

A porous polycarbonate membrane, 1-micron pore diameter, d. 0.94-0.97 g./cc., Ref. Ind. 1.623-1.585, (General Electric's Nuclepore) was soaked in 30 percent sulfuric acid for 15 minutes and interposed between the pair of electrode assemblies to form a cell. The membrane was 0.0005 inch thick and 1.00 inch in diameter and served the function of electronically insulating the opposed electrodes.

The assembled cell was then placed between two metal cylinders of a clamp and held in position by means of a 1.25-inch (I.D.) phenolic retaining ring slipped over the capacitor and cylinder assembly. The bolts of the clamp were then tightened to compress the capacitor assembly under a pressure of 480 p.s.i., sufficient to render the cell a compact unit. The capacity of the cell was then determined while the cell remained in the clamp, and the following results were obtained on applying a 1-volt charge to the capacitor:

| | |
|---|---|
| Capacitance | 3.4 f. |
| Resistance | 70 milliohms |
| Leakage current | 13 milliamps |
| Volume of carbon electrode | 0.016 inch$^3$ |

EXAMPLE II

A capacitor was constructed and assembled as in example I except that the opposing electrode was composed of a paste of boron carbide (obtained from Fisher Scientific, Pittsburgh, Penn. [No. 423623, F72]) which had a particle size equivalent to −320 mesh. The carbon paste electrode was molded under a pressure of 360 lb. of ram force and 20 ml. of electrolyte were added after molding. The polycarbonate separator employed had a pore diameter of 2 microns.

Measurements made on applying a 1-volt charge to the capacitor were as follows:

| | |
|---|---|
| Capacitance | 2.04 f. |
| Resistance | 730 milliohms |
| Leakage current | 3.6 milliamps |
| Volume of carbon electrode | 0.016 inch$^3$ |

EXAMPLE III

A capacitor was constructed as in example II with the exception that the opposing electrode was composed of a paste of tungsten carbide (ST 250 grade, 1398C obtained from Hermann C. Starck, Berlin, Werk. Goslar and distributed by Shieldalloy Corp.) which had a particle size equivalent to −325 mesh.

The following measurements were determined on applying a 1-volt charge to the capacitor:

| | |
|---|---|
| Capacitance | 0.81 f. |
| Resistance | 39 milliohms |
| Leakage Current | 50 milliamps |
| Volume of carbon electrode | 0.016 inch$^3$ |

EXAMPLE IV

A capacitor was assembled as in example I with the exception that the opposing electrode was composed of a paste of tantalum carbide (obtained from shieldalloy Corp., particle size of 0.01 to 0.03 microns) and the separator employed was composed of an anisotropic membrane consisting of two separate layers of microporous plastic sheet of the same polymer composition, the substrate consisting of microporous sponge with a porosity of 50–80 percent and an overlay of a thin film having a porosity of 1–3 percent. The membrane had a resistivity in 40% KOH of 3.8 ohm-cm., an electrolytic permeability of 0.63, water permeability of 3.3 cc./cm.$^2$/min. and a pore radius of 40 A. On applying a 1-volt charge to the capacitor, the following measurements were made:

| | |
|---|---|
| Capacitance | 1.6 f. |
| Resistance | 5.4 milliohms |
| Leakage Current | 4 milliamps |
| Volume of carbon electrode | 0.016 inch$^3$ |

EXAMPLE V

A capacitor was assembled as in example IV with the exception that the opposing electrode was composed of a paste of niobium boride (obtained from Hermann C. Starck, Berlin, Werk. Goslar and distributed by Shieldalloy Corp.) which had a particulate size equivalent to −325 mesh.

The following measurements were determined on applying a 1-volt charge to the capacitor:

| | |
|---|---|
| Capacitance | 0.6 f. |
| Resistance | 297 milliohms |
| Leakage Current | 1.6 milliamps |
| Volume of carbon electrode | 0.016 inch$^3$ |

We claim:
1. An electrolytic capacitor comprising a housing, at least one pair of taste electrodes in said housing, one of said electrodes being composed of carbon and the opposing electrode being composed of a refractory hard carbide or boride selected from the group consisting of boron carbide, tantalum carbide, zirconium carbide, tungsten carbide, titanium carbide, niobium carbide, tantalum boride, zirconium boride, tungsten boride, titanium boride, and niobium boride, one of said electrodes being compressed from a viscous paste of carbon particles and the other from a viscous paste of a refractory hard carbide or boride in admixture with an electrolyte, and an ionically conductive separator means between and in contact with said electrodes electronically separating said electrodes from each other.

2. Capacitor of claim 1 wherein said carbon paste electrode comprises activated carbon material having a surface area in the range of 100–2,000 meters$^2$/g., admixed with said electrolyte.

3. Capacitor of claim 1 wherein said separator is a porous separator saturated with an electrolyte.

4. Capacitor of claim 3 wherein said saturated porous separator includes a wetting agent facilitating saturation of said separator with said electrolyte.

5. Capacitor of claim 1 including an electrically conducting member on the surface of each of said electrodes facing way from the separator-contact surface, said member functioning as a current collector and as an impervious barrier to the passage of said electrolyte.

6. Capacitor of claim 5 including an annular insulating flexible means for confining the periphery of said electrodes held captive by said member.

7. The capacitor of claim 6 wherein the capacitor assembly of the component parts is compressed under a pressure of at least 240 p.s.i. to render said capacitor a compact unit.

8. An electrolytic capacitor comprising a plurality of cells connected in series, each cell consisting essentially of a pair of paste electrodes, an ionically conducting separator means interposed between and electronically separating said electrodes, and a conducting current collector member forming an impervious barrier to the passage of said electrolyte disposed between said cells, one of said electrodes containing activated carbon material having a surface area in the range of 100–2,000 meters$^2$/g. and the opposing electrode consisting of a refractory hard carbide or boride selected from the group consisting of boron carbide, tantalum carbide, zirconium carbide, tungsten carbide, titanium carbide, niobium carbide, tantalum boride, zirconium boride, tungsten boride, titanium boride, and niobium boride, said electrode materials being mixed with an electrolyte forming a viscous paste.

9. Capacitor of claim 8 wherein said separator is saturated with said electrolyte and said activated carbon material has a surface area in the range of 500–1,500 meters$^2$/g.

10. Capacitor of claim 9 including an insulating flexible annular means held captive by said members for confining periphery of said electrodes.

* * * * *

UNITED STATES PATENT OFFICE
CERTIFICATE OF CORRECTION

Patent No. 3,634,736         Dated January 11, 1972

Inventor(s) Donald L. Boos and Joseph E. Metcalfe III

It is certified that error appears in the above-identified patent and that said Letters Patent are hereby corrected as shown below:

"      Line 64, "Shield alloy" should be --Shieldalloy--
      "      Line 74, "sp." should be --Sp.--
Column 5: Line 4, "elongation" should be --Elongation--
      "      Line 13, "Nuclepore" should be --Nuclepore®--
      "      Line 28, "Capacitance" should be --Capacity--
      "      "         "3.4 f" should be --3.4 F--
      "      Line 35, "example I" should be --Example I--
      "      Line 40, "20 ml." should be --20 mls.--
      "      Line 45, "Capacitance" should be --Capacity--
      "      "         "2.04 f" should be --2.04 F--
      "      Line 52, "example II" should be --Example II--
      "      Line 61, "Capacitance" should be --Capacity--
      "      "         "0.81 f" should be --0.81 F--
      "      Line 66, "example I" should be --Example I--
      "      Line 68, "shieldalloy" should be --Shieldalloy--
Column 6: Line 6, "Capacitance" should be --Capacity--
      "      "         "1.6 f" should be --1.6 F--
      "      Line 21, "Capacitance" should be --Capacity--
      "      "         "0.6 f" should be --0.6 F--

In the claims:

Column 6: Line 27, "taste" should be --paste--
      "      Line 51, "way" should be --away--

Signed and sealed this 10th day of April 1973.

(SEAL)
Attest:

EDWARD M. FLETCHER, JR.
Attesting Officer

ROBERT GOTTSCHALK
Commissioner of Patents